(12) United States Patent
Kudo

(10) Patent No.: US 7,528,911 B2
(45) Date of Patent: May 5, 2009

(54) LIQUID CRYSTAL DISPLAY DEVICE AND METHOD OF MANUFACTURING THE SAME

(75) Inventor: Yasuki Kudo, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 132 days.

(21) Appl. No.: 11/790,160

(22) Filed: Apr. 24, 2007

(65) Prior Publication Data

US 2007/0247574 A1    Oct. 25, 2007

(30) Foreign Application Priority Data

Apr. 24, 2006    (JP)    ............................. 2006-119165

(51) Int. Cl.
*G02F 1/1335*    (2006.01)
(52) U.S. Cl. ...................... 349/114; 349/113
(58) Field of Classification Search ................. 349/114, 349/113
See application file for complete search history.

(56) References Cited

U.S. PATENT DOCUMENTS 6,281,952 B1    8/2001    Okamoto et al.
6,967,702 B2    11/2005    Ishii et al.

FOREIGN PATENT DOCUMENTS

| JP | 11-242225 | 9/1999 |
|----|-----------|--------|
| JP | 11-242226 | 9/1999 |
| JP | 2003-287754 | 10/2003 |
| JP | 2004-246328 | 9/2004 |

*Primary Examiner*—David Nelms
*Assistant Examiner*—David Y Chung
(74) *Attorney, Agent, or Firm*—Young & Thompson

(57) ABSTRACT

By using a photosensitive organic film, an uneven layer for forming a reflective electrode of a reflective region of a transflective liquid crystal display device and a protrusion for multi-division alignment of liquid crystals are concurrently formed. The heights of the uneven layer and of the protrusion are adjusted by using accumulated amounts of light to which the photosensitive organic film is exposed. The uneven layer can be used as an adjusting layer for adjusting the thickness of a liquid crystal layer.

21 Claims, 9 Drawing Sheets

LIQUID CRYSTAL DISPLAY DEVICE AND METHOD OF MANUFACTURING THE SAME

BACKGROUND OF THE INVENTION

1. Field of the Invention

The present invention relates to a liquid crystal display device and a method of manufacturing the same, and particularly to a transflective liquid crystal display device (hereinafter referred to as a transflective LCD device) and a method of manufacturing the same.

2. Description of the Related Art

Transflective LCD devices are increasingly adopted to displays or display units which are mounted on mobile devices such as recent cellular phones, digital camcorders and digital cameras. This is because usual transmissive liquid crystal display devices (hereinafter, referred to as a transmissive LCD device), which are used for a display of a laptop computer and a monitor of a desktop computer, have the following disadvantage. Specifically, in a case of the transmissive LCD device, it is hard to view the display at a site in strong sunlight due to the reflection of the light on the surface of the LCD device.

As a light source, the use the backlight indoors, and use ambient light, such as the sunlight, outdoors. Thus, as for transflective LCD devices, a good display performance is obtained anywhere. In addition, since the power consumption in the transflective LCD devices is small, the devices are most suitable as the displays for the mobile devices and the cameras.

Recent mobile devices, especially cellular phones and the like, have functions not only as telephones, but also as digital cameras and as devices that allow the users to watch TV. In such uses, the LCD devices have been more frequently used in a landscape mode in addition to a portrait mode. In such a case, when a viewing angle (a field of view) of an LCD device is narrow, the difference in display quality between the portrait mode and the landscape mode is markedly great. As a result, the performance of the LCD device decreases in the case of the landscape mode. Consequently, demand for a small LCD-device with a wide viewing angle has increased.

Some of methods for making a transflective LCD device to have a wide viewing angle will be described below. In general, an LCD device having twisted nematic type (TN type) liquid crystal material has a narrow viewing angle. For this reason, an optical compensation film is frequently used as a method of increasing the viewing angle. In this method, although the viewing angle in the horizontal direction increases to some extent, an increase in the viewing angle in the vertical direction is limited. As a result, the viewing angle in the portrait mode and that in the landscape mode are different from each other in this LCD device. This is not a problem in a case of a display device, such as a monitor, which is fixed when in use. However, in a case of a mobile device used in both portrait and landscape modes, the performance of the LCD device may decrease for a TN-type LCD device in which the optical compensation film is used. As a consequence, in recent years, a vertical-alignment liquid crystal display device (a VA-LCD device) having liquid crystal material with negative dielectric anisotropy is increasingly used for a mobile device. In a case of a VA-LCD device, when a voltage is not applied, liquid crystal molecules (LC molecules) are aligned perpendicular to a glass substrate. When a voltage is applied, the LC molecules are tilted according to a voltage value, and then the LC molecules show optical anisotropy. However, when the LC molecules are not regulated, the directions in which the LC molecules incline are not fixed. For this reason, it is necessary to regulate the inclination directions of the LC molecules. When regulating the directions, the property of a wide viewing angle can be obtained by using a multi-domain alignment method for causing the LC molecules to evenly incline in all directions. The alignment of the LC molecules is usually divided into two or four directions.

In a usual multi-domain alignment method of the LC molecules, each electric flux line between substrates facing each other is deformed so as to control the inclination directions of the LC molecules. There are two methods for deforming the electric flux lines between substrates, and thereby controlling the inclination directions of the LC molecules. In one method, a protrusion is formed of an organic insulating film or the like. In the other method, slits are provided to a pixel electrode. An example of the method in which a protrusion is formed of an organic insulating film or the like is disclosed in Japanese Patent Application Laid-open Publication No. H-11-242225 (hereinafter referred to as Patent Document 1). An example of the method in which slits are provided to a pixel electrode is disclosed in Japanese Patent Application Laid-open Publication No. 2004-069767 (hereinafter referred to as Patent Document 2). Patent Documents 1 and 2 described above are used separately or in combination. Manufacturing costs for multi-domain alignment of the LC molecules by using the protrusion is higher than that using the electrode slit since an organic insulating film needs to be used to form the protrusion. Hence, in many cases, the protrusion is provided to one of a pair of substrates forming an LCD device, and slits are provided to a pixel in the other substrate. The use of any one of the methods increases the number of processes for manufacturing a VA-LCD device as compared with a case where TN-type LC is used, and thereby manufacturing costs for the VA-LCD increases.

An example, in which neither a protrusion or slits are used for multi-domain alignment of the LC molecules, has been proposed in Japanese Patent Application Laid-open Publication No. 2003-287754 (hereinafter, referred to as Patent Document 3) and the like. This Patent Document 3 discloses a method in which multi-domain alignment of the LC molecules is achieved with a pixel electrode formed smaller than a common electrode facing the pixel electrode, and formed in a fairly-symmetric shape. However, there is a problem that the alignment of the LC molecules is not stable since the central point of each of multi-domains of LC molecules cannot be fixed.

Furthermore, in the transflective LCD device, conditions (retardation values) under which the optimum optical properties can be obtained are different between the transmissive and the reflective region not only in a case of the VA type LCD device, but also in a case of the other types. For this reason, as described in Japanese Patent Application Laid-open Publication No. H-11-242226 (hereinafter referred to as Patent Document 4), it is necessary to use a multi-gap structure in which the thickness of liquid crystal layer in the transmissive region is different from that of the reflective region. In addition, for purpose of obtaining the good reflective performance of transflective LCD device, it is necessary to form a reflective electrode with an uneven surface for obtaining a diffuse reflection property. To form the uneven surface, a photosensitive organic film is normally used. Aforementioned Patent Document 4 discloses a method in which the organic film for forming the uneven surface is also used as an adjusting layer for adjusting the thickness of an LC layer for forming a multi-gap structure.

As described above, in one of the pair of substrates in the VA type transflective LCD device, it is necessary to form three elements, that is, the adjusting layer for adjusting the thickness of the LC layer, the reflective electrode with the uneven surface, and any one of the protrusion and the pixel slit for multi-domain alignment of the LC molecules. Japanese Patent Application Laid-open Publication No. 2004-246328 (hereinafter referred to as Patent Document 5) discloses a method for concurrently forming protrusions and an organic insulating film with an uneven surface for diffusion reflection. Here, the protrusions are used to achieve multi-division alignment of the LC molecules. However, in the method of Patent Document 5, an organic insulating film needs to be formed twice in order to separately form an adjusting layer for the thickness of an LC layer.

SUMMARY OF THE INVENTION

An object of the present invention is to provide a transflective LCD device which solves the above-described problems in the prior art.

A transflective LCD device of the present invention includes an uneven layer in a reflective region, and a reflective electrode on the uneven layer. Here, the uneven layer is formed of a material for an organic film. A transmissive region is provided with a protrusion which is formed of the material for the organic film, and which is for spatially dividing the alignment of the LC molecules in an LC layer into multiple domains. In the transflective LCD device of the present invention, an uneven layer of the reflective region and a protrusion of the transmissive region are both formed of a material for the organic film. This material for the organic film is formed of a photosensitive organic film. An uneven layer of the reflective region is characterized in that it is also used as an LC-layer-thickness adjusting layer which causes the thickness of the LC layers of the reflective region and that of the transmissive region to be different from each other. In a transflective LCD device of the present invention, an LC with negative dielectric anisotropy is used for the LC layer.

In the transflective LCD device of the present invention, a protrusion can be provided on or under a pixel electrode. In the transflective LCD device of the present invention, the height of the uneven layer and that of the protrusion can be formed differently from each other. Incidentally, the uneven layer in the reflective region can be made higher than that of the protrusion in the transmissive region.

In the transflective LCD device of the present invention, a transmissive electrode of the transmissive region and a reflective electrode of the reflective region are formed as follows. Specifically, after the transmissive electrode made of a transparent film is formed on an insulating substrate, a photosensitive organic film is formed on the insulating substrate. Moreover, using a photomask, the photosensitive organic film is exposed, and then is developed. Then, in areas respectively of the reflective region and the transmissive region on the insulating substrate, an uneven layer and a protrusion, which are formed of photosensitive organic films, are concurrently formed. A reflective electrode made of a light reflection film is formed on the uneven layer. The height of the uneven layer and that of the protrusion are adjusted by controlling an estimated amount of light exposure. Incidentally, after forming the uneven layer and the protrusion using the photosensitive organic film, the transmissive electrode may be formed in an area of the transmissive region including the protrusion.

In the transflective LCD device of the present invention, a protrusion for multi-domain alignment of the vertical-alignment liquid crystal material and an uneven layer of the reflective region, which is also used as an LC-layer-thickness adjusting layer, are concurrently formed in the same manufacturing processes as those for a usual transflective LCD device using a TN type LC with positive dielectric anisotropy. Accordingly, the present invention makes it possible to obtain a low-cost transflective LCD device with wide viewing angle and with a high contrast ratio.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Figure 1A:
FIGS. 1A to 1G are cross-sectional views for illustrating processes of manufacturing an LCD device according to a first embodiment of the present invention.

An embodiment of an LCD device of the present invention will be described below with reference to FIGS. 1A to 1G. First, a chromium (Cr) film is formed on a glass substrate 11 by sputtering. By patterning this Cr film, a gate electrode 12 of a thin film transistor (TFT), which is used for switching a pixel, and a scanning line (not shown) are formed (FIG. 1A)

Figure 1B:
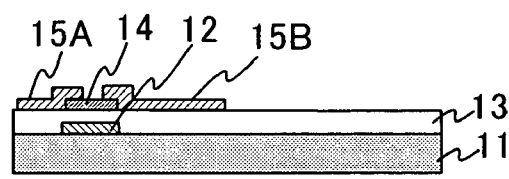

Thereafter, by a chemical vapor deposition (CVD) method, a silicon nitride ($SiN_x$) film is formed as a gate insulating film 13 on the entire surface of the glass substrate 11. Subsequently, by the CVD method, an amorphous silicon (a-Si) film is formed as a semiconductor film, and a phosphorus-doped amorphous silicon ($n^+$a-Si) film is formed as an ohmic contact film. Then, the a-Si film and the $n^+$a-Si film are patterned to be in the shape of islands by photolithography to form a semiconductor film 14. Subsequently, the Cr film is formed by sputtering and patterned to form a source electrode 15B, a drain electrode 15A and a signal line (not shown) of the TFT (FIG. 1B). Then, after an $n^+$a-Si film remained between the source electrode 15B and the drain electrode 15A is removed, an $SiN_x$ film is formed by a CVD method as a passivation film 16.

Thereafter, a contact hole 17 is formed on the passivation film 16. A transmissive electrode 18 is formed by using an indium tin oxide (ITO) film. The ITO film is formed by sputtering. The transmissive electrode 18 is electrically connected to the source electrode 15B through the contact hole 17

Figure 1C:
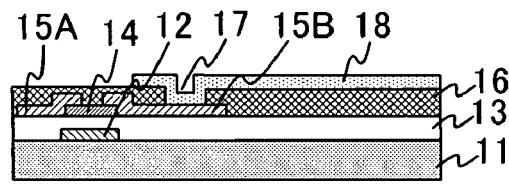
Figure 1D:
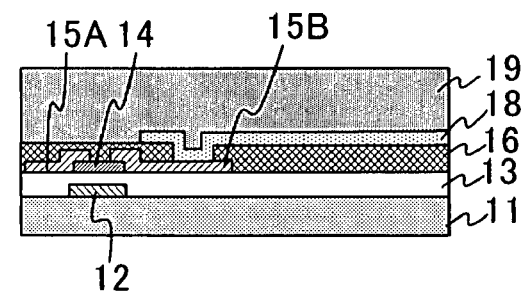
Figure 1E:
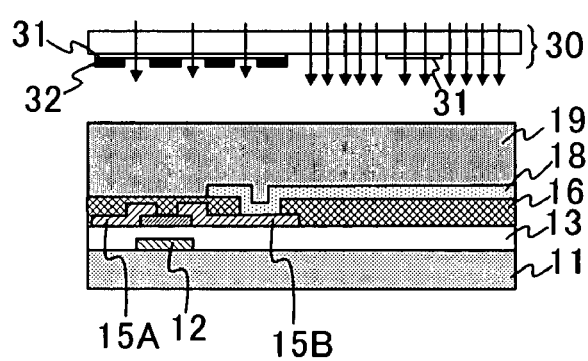

(FIG. 1C). Next, a positive-type photosensitive acrylic resin is formed as an organic film 19 by a spin coating method, on the entire surface-of the glass substrate 11 (FIG. 1D) Then, using a photomask 30, exposure is performed (FIG. 1E). Incidentally, arrows illustrated on a part of the photomask 30 of FIG. 1E figuratively represent an amount of light transmitting through the photomask 30.

Figure 1F:
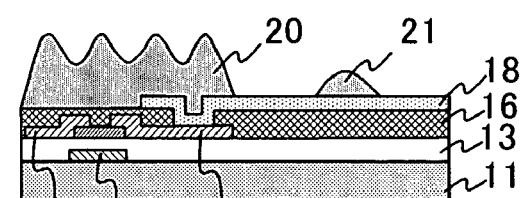

Subsequently, by performing a development process and a heat treatment, an uneven layer 20 for obtaining a diffuse reflection property, and a protrusion 21 for multi-domain alignment of LC molecules are simultaneously formed (FIG. 1F). At this time, the thickness of an LC layer of a transmissive region 1 after completion of the LCD device is set to be approximately twice the thickness of an LC layer of a reflective region 2. For this reason, the height of the uneven layer 20 from the surface of the substrate is adjusted so that there is a difference in thickness between the LC layers of the transmission part 1 and the reflection part 2. The height of the uneven layer 20 from the surface of the substrate is adjusted by selecting an appropriate thickness of coating acrylic resin and an appropriate amount of light exposure. In addition, although the protrusion 21 concurrently formed needs not be as high as the LC-layer-thickness adjusting layer, the amount of light exposure of the protrusion 21 is set larger than that of the uneven layer 20 since the protrusion 21 is formed of the photosensitive acrylic resin which is the same as the material of the uneven layer 20. As a result, the protrusion 21 can be formed lower than the uneven layer 20.

Figure 1G:
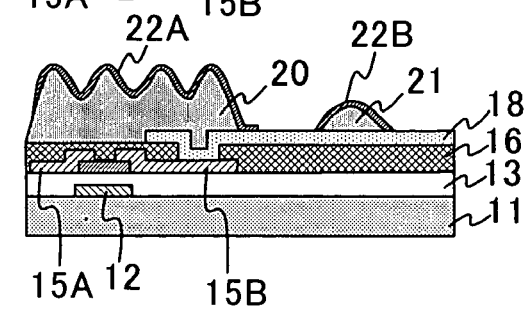

After that, on the uneven layer 20 and the protrusion 21, electrode films 22A and 22B configured of laminated films formed of an aluminum (Al) film, a molybdenum (Mo) film and the like, are respectively formed (FIG. 1G). At this time, the transmissive electrode 18 and the electrode film 22A partly overlap each other, and then are electrically connected to each other. The electrode film 22A on the uneven layer 20 is used as a reflective electrode in a reflective region. Incidentally, the Al film and the Mo film are formed by sputtering. As the materials of the electrode films 22A and 22B, silver (Ag) or the like can be used instead of the laminated films each formed of the Al film and the Mo film. The electrode films 22A and 22B may be formed of laminated films of more than two layers. Each of Al and Mo may be an alloy formed with another metal. The electrode film 22A may be formed of a single layer such as Al or Ag.

Figure 2:
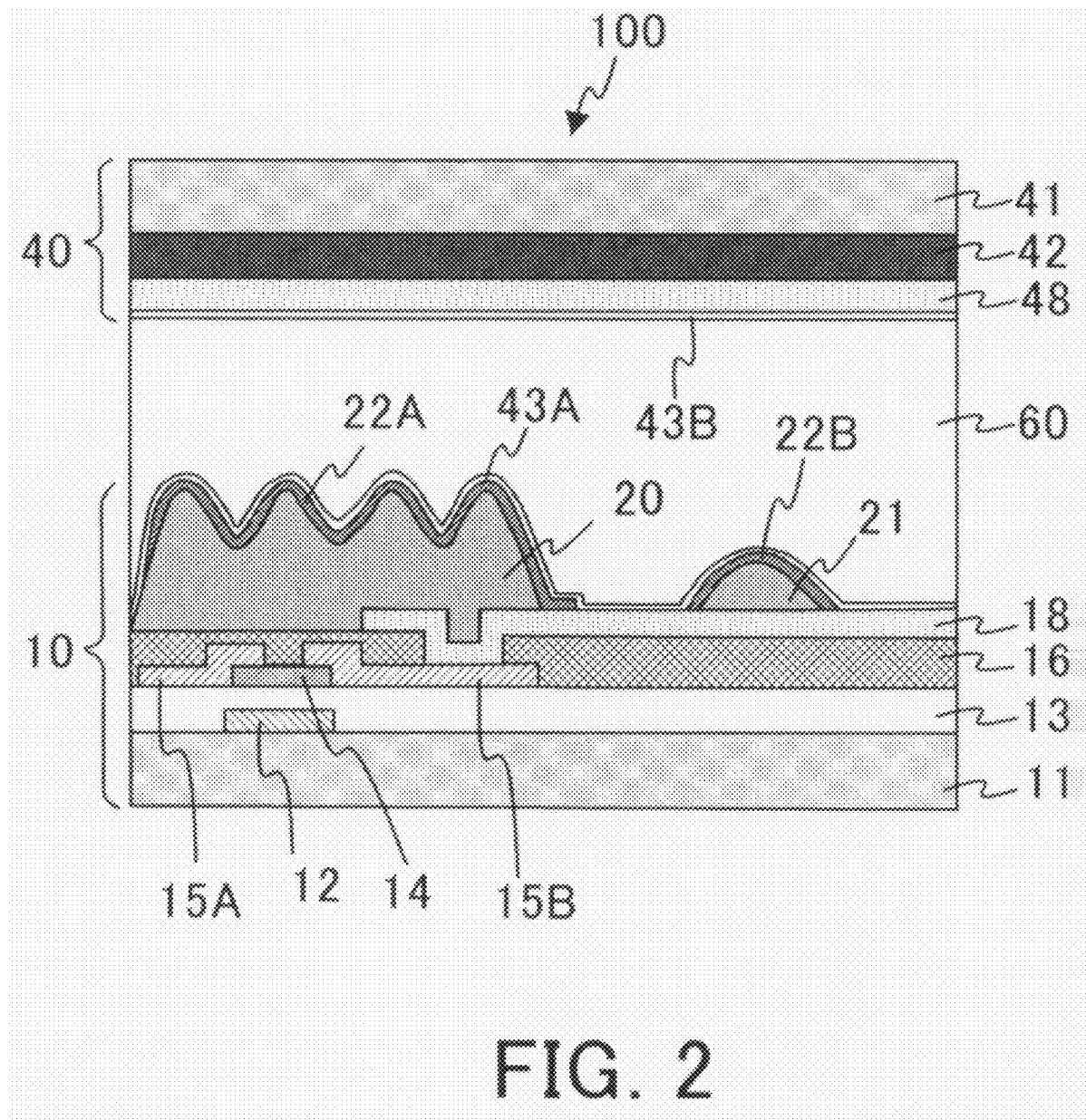
FIG. 2 is a cross-sectional view of the LCD device according to the first embodiment of the present invention.

Subsequently, an alignment film 43A formed of polyimide resin is formed on a TFT substrate 10. Thereafter, a CF substrate 40 that similarly application was done of alignment film 43B including a color filter (CF) 42 is overlapped with the TFT substrate 10 using a spacer (not shown) to control the distance between these substrates. Then, the liquid crystal material is filled in between these substrates, and are then enclosed therein with a sealant. Thereby, an LC layer 60 is formed, and thus an LCD device 100 is completed (FIG. 2).

On the photomask 30 used for an exposure of the organic film 19 shown in FIG. 1E, an opaque film 32 is formed in an area which corresponds to a convex part of the uneven layer 20. Then, on the photomask 30, semitransparent films 31 are respectively formed in areas corresponding to a concave part and an area corresponding to the protrusion 21. In many cases, the semitransparent film 31 is mainly formed of any one of semitransparent films including a thin metallic film formed of Cr or the like, a silicide film formed of tungsten (W) or Mo, a metallic oxide film, or the like. By choosing appropriate light transmittance and an amount of light exposure of the semitransparent film 31, the height of the uneven layer 20 from the surface of the substrate and the height of the protrusion 21 from the surface of the substrate can be set to be desired values. More types of conditions for processes can be included by setting different values for the light transmittance of the semitransparent films in the following two respective areas of the photomask 30. Specifically, one of the areas corresponds to the uneven layer 20 and the other area corresponds to the protrusion 21. For example, when the transmittance of the semitransparent film in an area corresponding to the protrusion is set higher than that of the semitransparent film in an area corresponding to the uneven layer, the protrusion 21 can be made lower than the uneven layer 20 with the same light exposure.

Incidentally, although the positive-type photosensitive acrylic resin is used to exemplify the material of the organic film 19, an opaque organic film formed of novolac resin or the like, or an organic film other than the opaque organic film may be used. Moreover, the material of the organic film 19 may be a negative-type photosensitive resin.

In addition, a pattern less than the limit of resolution of an exposure equipment can be used, instead of the semitransparent film 31. For example, in a case where the resolution limit of the exposure equipment is 3 μm, the same effect as that of the semitransparent film can be obtained by providing grids or lines/spaces having the size of 1 μm to a photomask, or by arranging dots having the size of 1 μm. This method is generally referred to as a gray tone in contrast to a halftone using a semitransparent film. A gray tone mask makes it possible to control light transmittance by choosing the appropriate widths of the lines/spaces and the width of the spaces, or the size of the dots and the intervals therebetween. The gray tone mask has a merit that manufacturing costs thereof is reduced since fewer processes are required for the gray tone mask than for the halftone mask. Also in a case where the gray tone mask is used, the height of the uneven layer and that of the protrusion can be controlled by changing the light transmittance of the two areas of the gray tone mask, which are an area corresponding to the uneven layer 20 and an area corresponding to the protrusion 21.

Figure 3:
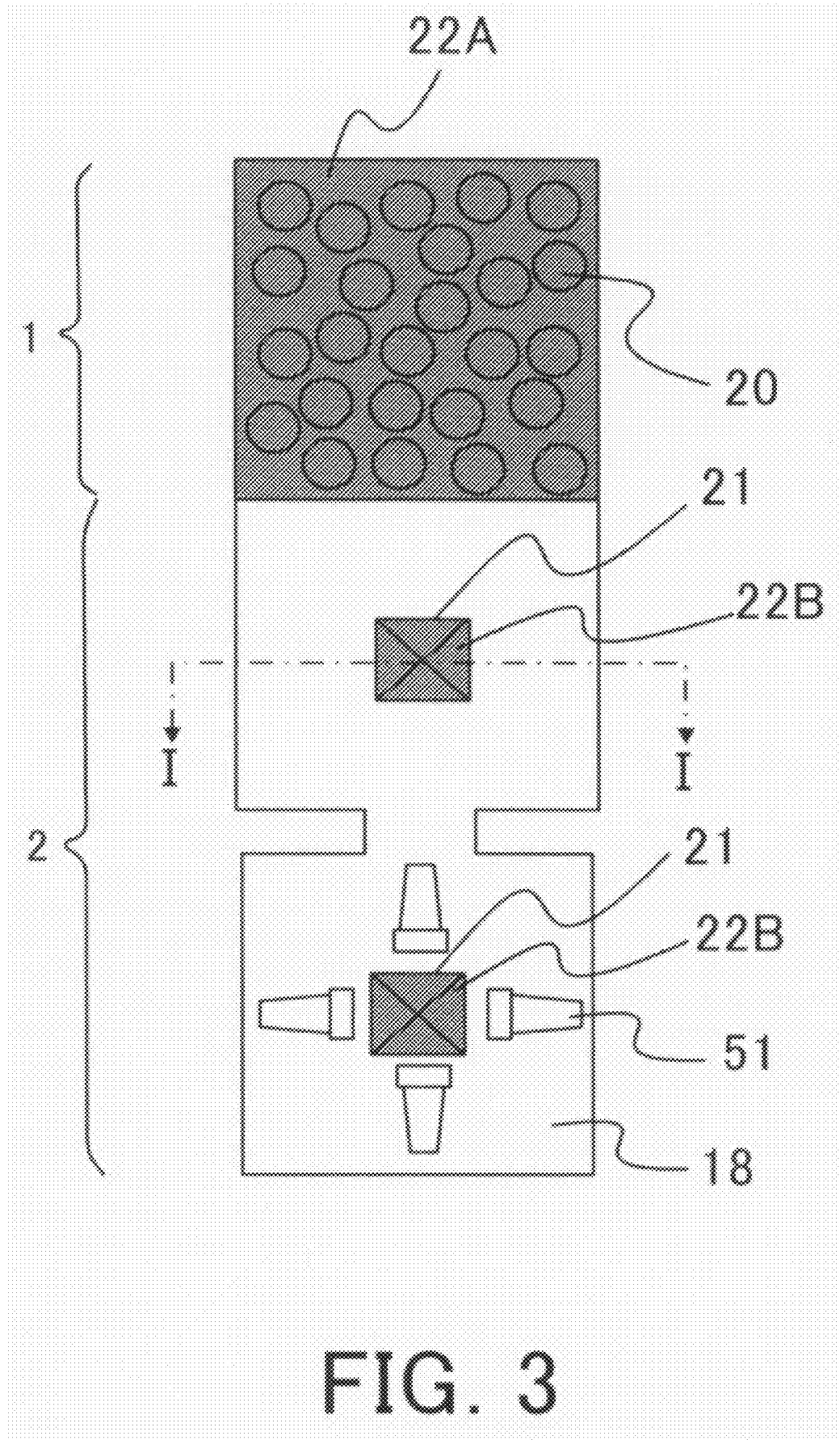
FIG. 3 is a plan view of a pixel of the LCD device according to the first embodiment of the present invention.

Next, an effect of multi-domain alignment of LC molecules of the present invention will be described with reference to FIGS. 3, 4A, and 4B. Referring to FIG. 3, a pixel includes a reflective region 1 and a transmissive region 2. An electrode film 22A is formed on an uneven layer 20 in the reflective region, and a transmissive electrode 18 is formed in the transmissive region. The electrode film 22A and the transmissive electrode 18 are electrically connected to each other. The transmissive electrode 18 has a shape formed in such a way that relatively symmetric shapes are connected to each other. In the example of FIG. 3, the shape is formed in a way that two squares are connected to each other. In the substantial center of each of the squares, a corresponding one of the protrusions 21 is formed. Each protrusion 21 has a shape of a square pyramid, along the surfaces of which LC molecules 51 are aligned. In the example shown in FIG. 3, the LC molecules 51 are aligned in four directions of upper, lower, right and left of the drawing. As an example other than that shown in FIG. 3, the protrusion 21 may be disposed in a way that the square-pyramid shape thereof is rotated at an angle of 45 degrees. In this case, although the direction in which a viewing angle is widened is rotated by 45 degrees, the appropriate direction and the size of the viewing angle can be chosen depending on in which direction the viewing angle is needed. The shape of the protrusion 21 may be a sphere. In this case, LC molecules are aligned uniformly along the entire surface of the sphere.

Figure 4A:
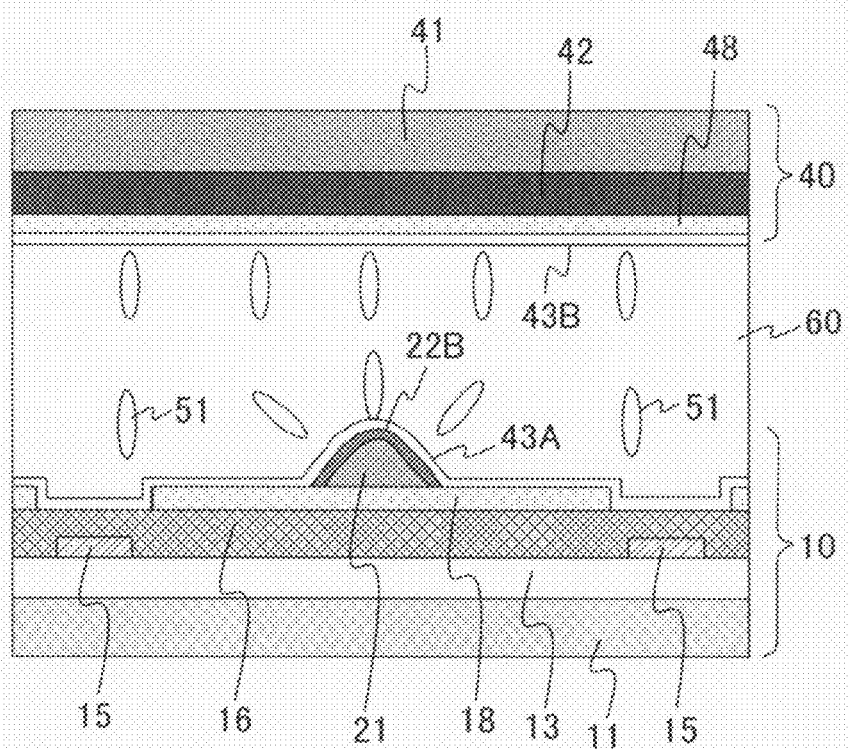
FIGS. 4A and 4B are cross-sectional views taken along the line I-I of FIG. 3, and are views for illustrating operations of the LCD device according to the first embodiment of the present invention.
Figure 4B:
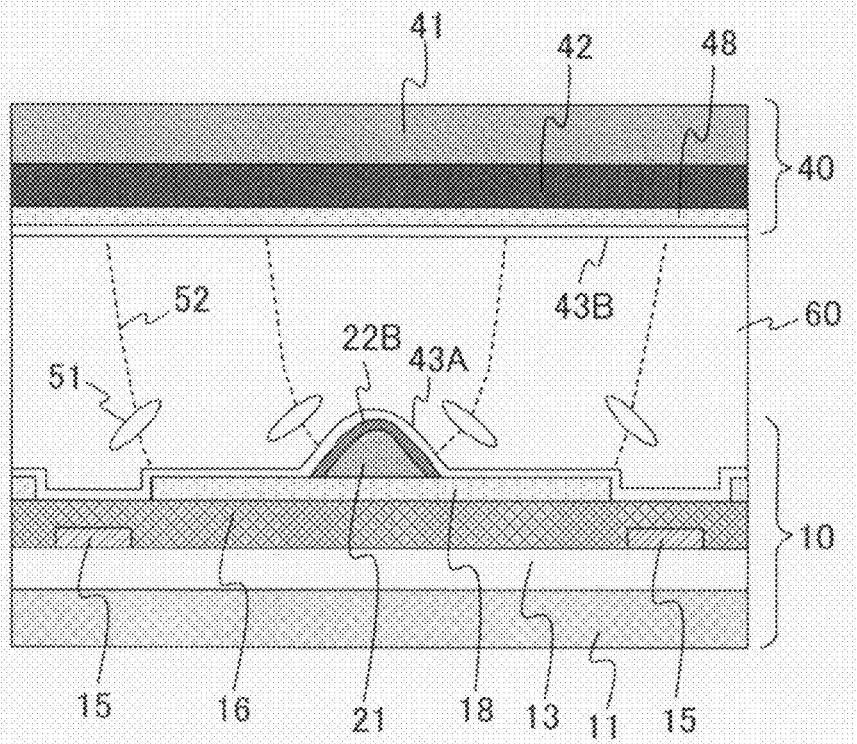

FIG. 4A is a view showing a state of the alignment of the LC molecules to which no voltage is formed. FIG. 4B is a view showing a state of the alignment of the LC molecules in a case where a voltage is formed between the transmissive electrode 18 and a common electrode 48. In FIGS. 4A and 4B, the same reference numerals as those in FIG. 1 designate the same elements or components as those in FIG. 1. Reference numerals 15 of FIGS. 4A and 4B designate signal lines. Normally, a CF 42 is provided to each pixel in the CF substrate 40. Here, the CF 42 is formed on the glass substrate 41, and is formed by using three kinds of color resists through which waves of light of red, blue, and green are transmitted, respectively. On the CF 42, an ITO film is provided as a common electrode 48. On the surfaces respectively of the TFT substrate 10 and of the CF substrate 40, alignment films 43A and 43B for vertical alignment are formed. As the materials of the alignment films 43A and 43B, polyimide resin or the like is used. An LC layer 60 having negative dielectric anisotropy interposed between the two substrates. Reference numerals 51 of FIGS. 4A and 4B schematically represent the LC molecules. When a voltage is not formed (FIG. 4A), the LC molecules 51 are aligned perpendicular to the surfaces of the alignment films 43A and 43B. Accordingly, in relatively flat parts of the transmissive electrode 18 and of the common electrode 48, the LC molecules 51 are aligned perpendicular to the substrates. However, since the LC molecules 51 in the part of the protrusion 21 are aligned perpendicular to the tilted surface, the LC molecules 51 are aligned in a way that they are tilted against the surface of the substrate 11. When a voltage is formed between the transmissive electrode 18 and the common electrode 48, electric flux lines 52 are generated, as shown in FIG. 4B, due to the effects of the edge of the transmissive electrode 18 and the protrusions 21. The LC molecules 51 tilt as shown in FIG. 4B since the LC molecules 51 tend to align in a way that the longitudinal directions thereof are perpendicular to the electric flux lines. Hence, as shown FIG. 3, the protrusion 21 in a shape of a square pyramid makes it possible to regulate a state of the LC molecules 51 to be one in which the LC molecules are aligned in four directions. This is because the LC molecules 51 are aligned with the four surfaces of the square pyramid. At this time, since the transmissive electrode 18 has a symmetric shape, such as the square shown in FIG. 3, and since the common electrode 48 is larger than the transmissive electrode 18, the electric flux lines 52 are made symmetrical to each other along the four edges of the transmissive electrode 18. Thereby, the LC molecules are aligned in four directions as in the above case. The LC molecules are aligned stably in four directions by causing the surfaces of the protrusions 21 and the respective edges of the transmissive electrodes 48 to correspond to each other. Here, in a case where the protrusion 21 is not provided, the alignment of the LC molecules is unstable since the center of dividing domains is not fixed. In the present embodiment, providing the protrusion 21 to the center of the transmissive electrode 18 provides an effect of facilitating the LC molecules to align in four directions, and of stabilizing the alignment of the LC molecules by fixing the center of the dividing domain.

As described above, the transmissive region 2 has been described. Meanwhile, the uneven layer 20 is formed on the reflective region 1. Thus, each convex part has the same function as that of the protrusion 21 of the transmissive region 2, so that the LC molecules are aligned in different directions. Accordingly, a protrusion needs not be provided to the reflective region 1 as in the transmissive region 2. However, in order to stabilize the alignment of the LC molecules 51, slits may be formed in the common electrode toward the electrode film 22A, for the purpose of aligning the LC molecules 51.

The height of the uneven layer 20 and that of the protrusion 21 are described with specific values thereof. The thickness of an LC layer in a transmissive region is defined as an average distance between the alignment film 43A on the transmissive electrode 18 in the region where the protrusion 21 is not formed, and the alignment film 43B on the common electrode 48 of the CF substrate 40. The thickness of an LC layer in a reflective region is defined as an average distance between the alignment film 43A, which is formed on the surface of the electrode film 22A on the uneven layer 20, and the alignment film 43B on the common electrode 48 of the CF substrate 40. Moreover, the height of the uneven layer 20 and that of the protrusion 21 are defined respectively as average heights from the surface of the passivation film 16.

In a case where the thickness of the LC layer of the transmissive region 2 is set to be 4 μm, the thickness of the LC layer of the reflective region 1 is half the thickness of the transmissive region 2, i.e., 2 μm. For this reason, the height of the uneven layer 20, also serving as a LC-layer-thickness adjusting layer, needs to be 2 μm. In contrast, it suffices that the height of the protrusion 21 for performing-multi-domain alignment be 1 μm or less. Rather, when the height of the protrusion 21 is 2 μm, which is the same height as the uneven layer 20, an angle of a surface of a slope of the protrusion 21 against the surface of the substrate 11 (hereinafter referred to as a tilting angle) is large. As a result, the alignment of the LC molecules becomes unstable. In addition, if the tilting angle is reduced while maintaining the height of the protrusion 21 to be 2 μm, the bottom surface area of the protrusion 21 inevitably increase. However, when a voltage is not formed as shown in FIG. 4A, the LC molecules 51 are aligned obliquely to the substrate surface in the part of the protrusion 21. For this reason, birefringence occurs, and then light leaks in a black state. As a result, a contrast ratio (hereinafter referred to as contrast) is reduced. Hence, on the protrusion 21, an electrode film 22B which is formed of the same metallic film as the electrode film 22A is formed as a light shielding film. However, due to the electrode film 22B formed of a metallic film, transmittance is reduced at the time of a white state. Consequently, it is desirable that the protrusion 21 be formed low and small in the range in which no problem occurs at the time of multi-domain alignment on LC molecules. Consequently, the height of the protrusion 21 needs to be altered, in consideration of the fact that the height of the uneven layer 20 is fixed so that the uneven layer 20 can also serve as the LC-layer-thickness adjusting layer.

Figure 5A:
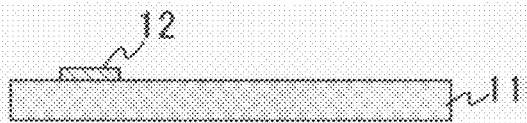
FIGS. 5A to 5F are longitudinal cross-sectional views for illustrating a process of manufacturing an LCD device according to a second embodiment of the present invention.
Figure 5B:
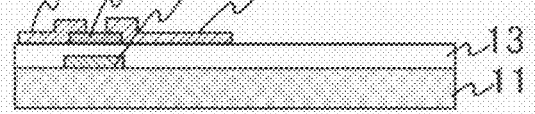

Next, a second embodiment will be described with reference to FIGS. 5A to 5F. On a glass substrate 11, a gate electrode 12 of a TFT and a scanning line (not shown) are formed of Cr films (FIG. 5A). The Cr films are formed by sputtering. Then, an SiN$_x$ film is formed as a gate insulating film 13 by a CVD method. Subsequently, by the CVD method, an a-Si film is formed as a semiconductor film, and an n$^+$a-Si film is formed as an ohmic connection layer. The a-Si film and the n$^+$a-Si film are patterned to be in island shapes by photolithography to form a semiconductor film 14. Thereafter, the Cr film is patterned by sputtering to form a source electrode 15B and a drain electrode 15A of the TFT, and a signal line (not shown) (FIG. 5B).

Figure 5C:
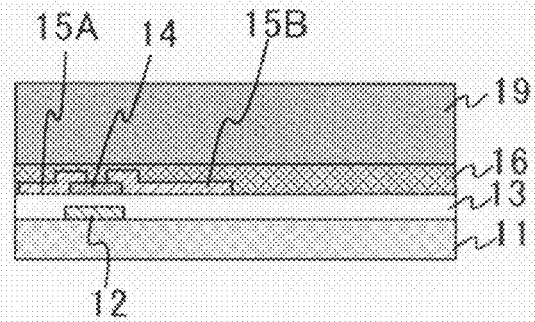
Figure 5D:
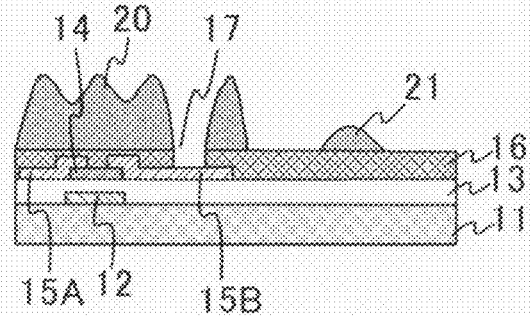
Figure 5E:
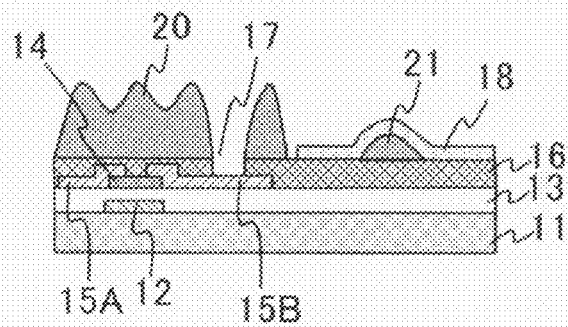

Then, the n$^+$a-Si film remained between the source electrode 15B and the drain electrode 15A is removed. Thereafter, an SiN$_x$ film is formed as a passivation film 16. Subsequently, acrylic resin, as an organic film 19, having the property of a positive-type photosensitivity is formed on the entire surface of the substrate (FIG. 5C). After that, an organic film 19 is exposed, and then developed. By performing a heat treatment on the organic film 19, an uneven layer 20, a protrusion 21 and a contact hole 17 are formed. The uneven layer 20 is used for obtaining a diffuse reflection property is formed. The protrusion 21 is used for performing multi-domain alignment on LC molecules is formed. The contact hole 17 is passed through the uneven layer 20. Furthermore, the contact hole 17 which is passed through the passivation film 16 is formed by a dry etching method (FIG. 5D). Then, an ITO film is formed as a transmissive electrode 18 by sputtering (FIG. 5E).

Figure 5F:
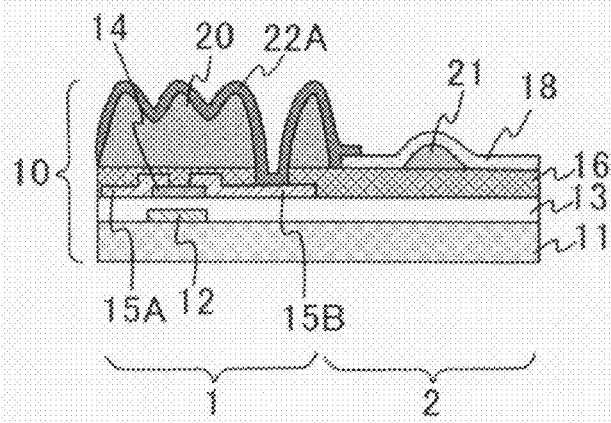

Next, a reflective electrode 22 configured of a laminated film formed of an Al film and an Mo film is formed on the uneven layer 20. The Al film and the Mo film are formed by sputtering. The reflective electrode 22 is electrically connected to the source electrode 15B through the contact hole 17. The transmissive electrode 18 is electrically connected to the reflective electrode 22 (FIG. 5F).

Figure 6A:
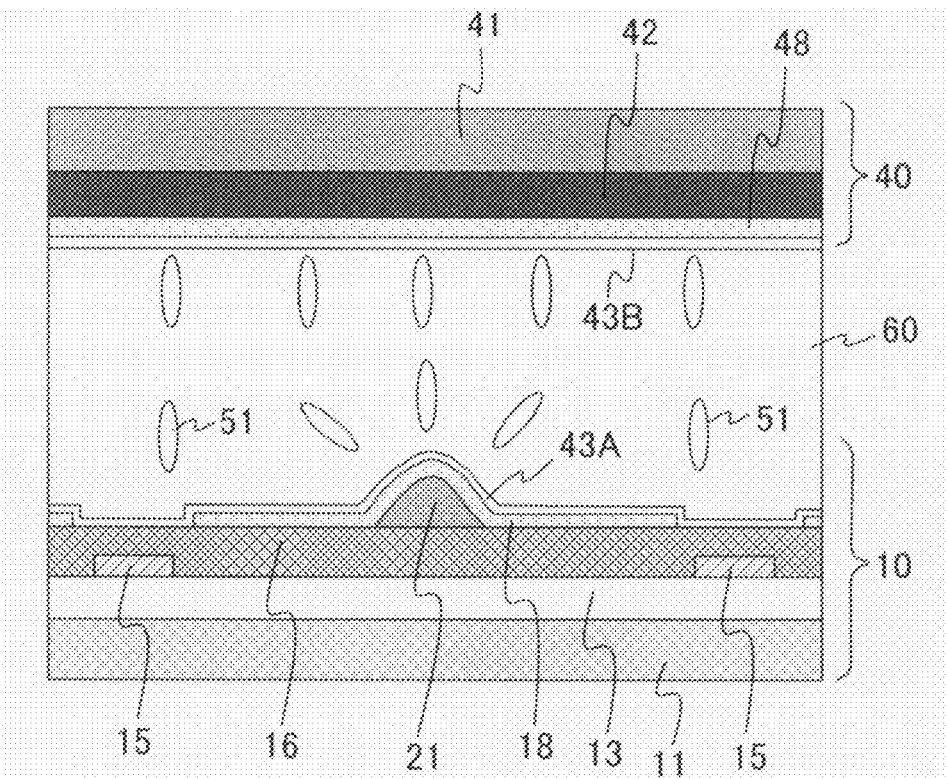
FIGS. 6A to 6B are cross-sectional views for illustrating operations of the LCD device according to the second embodiment of the present invention.
Figure 6B:
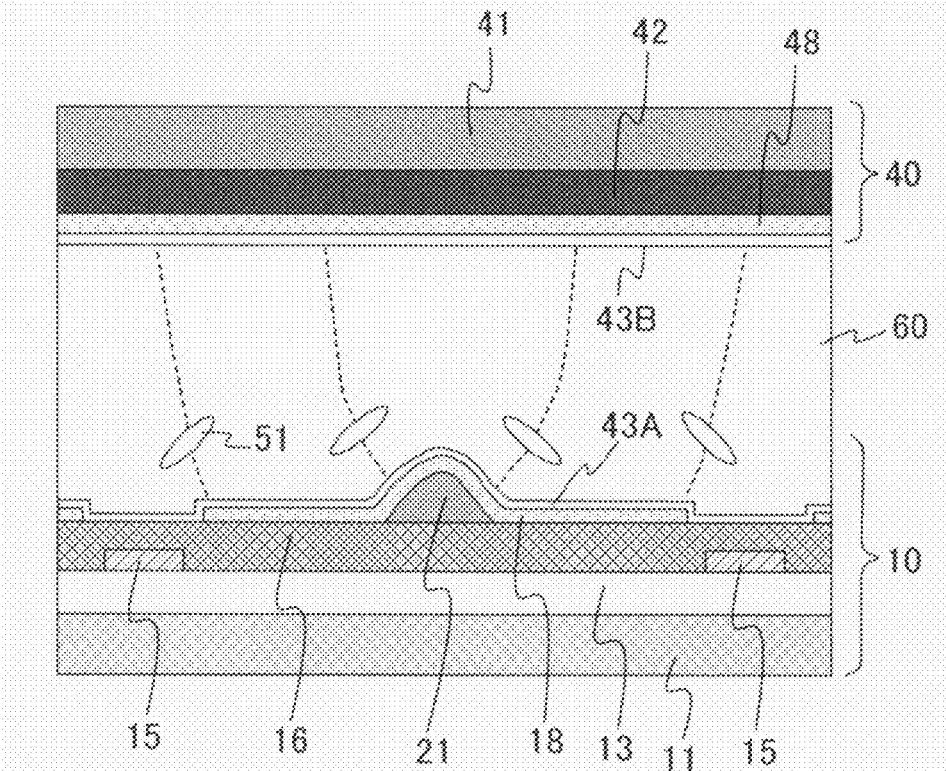

FIG. 6A shows the alignment of LC molecules in a case where a voltage is not formed. FIG. 6B shows the alignment of LC molecules in a case where a voltage is formed between the transmissive electrode 18 and the common electrode 48. Although the operation and the effect of the LCD device of the present invention are the same as those in the first embodiment, the present embodiment is different from the first embodiment in that the protrusion 21 of the present embodiment is formed under the transmissive electrode 18. As shown in FIG. 6A, since the LC molecules 51 are aligned in a tilted state around the protrusion 21 even when a voltage is not formed, a birefringence occurs. As a result, light leaks at the black state, and this causes the contrast to be reduced. Consequently, as in the first embodiment, reduction of the transmittance can be prevented by shielding the protrusion 21 with a metallic film. However, transmittance is reduced because an area of a part through which light passes at the white state (an aperture ratio) is reduced. For this reason, the luminance for the LCD device is reduced. Accordingly, whether the light shielding film is attached may be determined depending on which one of the luminance and the contrast is given a priority.

In a case where a light shielding film is provided to the protrusion 21 of the structure of the second embodiment of the present invention, the light shielding film can be formed by leaving a Cr film at the time when the gate electrode 12 or the source electrode (the drain electrode) is formed. Here, the material of the Cr film is the same as those of the gate electrode 12 or the source electrode. Incidentally, the light shielding film can also be formed at the time when the reflective electrode 22 is formed, by leaving the laminated film formed of an Al film and an Mo film, on the protrusion 21. Here, the material of the Al film and that of the Mo film is the same as that of the reflective electrode 22.

Figure 7:
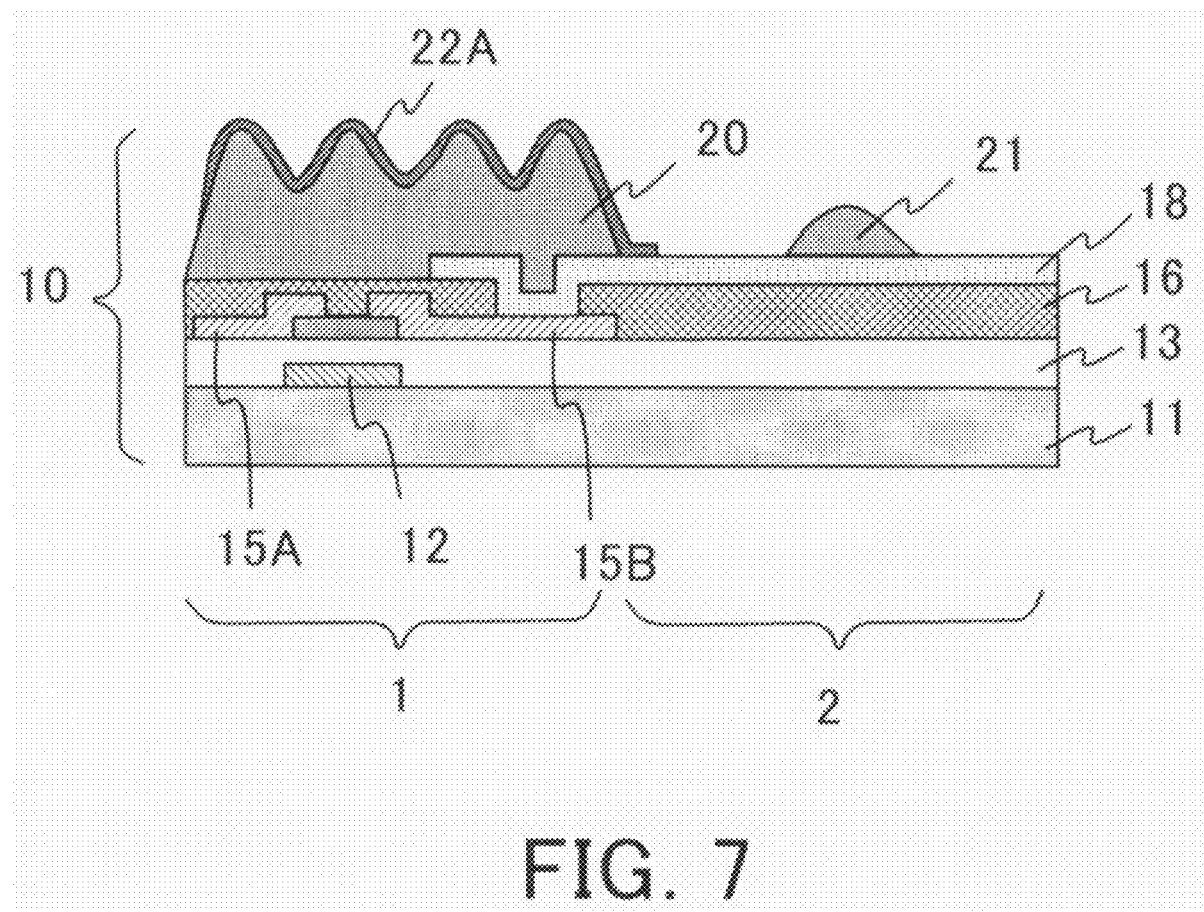
FIG. 7 is a cross-sectional view of an LCD device according to a third embodiment of the present invention.

Next, an LCD device according to a third embodiment of the present invention will be described with reference to FIG. 7. In the present embodiment, a protrusion 21 is formed on a transmissive electrode 18. Moreover, a reflective electrode is not formed on the protrusion 21. Although not formed in FIG. 7, a light shielding film may be provided to a lower layer of the protrusion 21, or to a CF substrate, as described in the second embodiment of the present invention.

Figure 8:
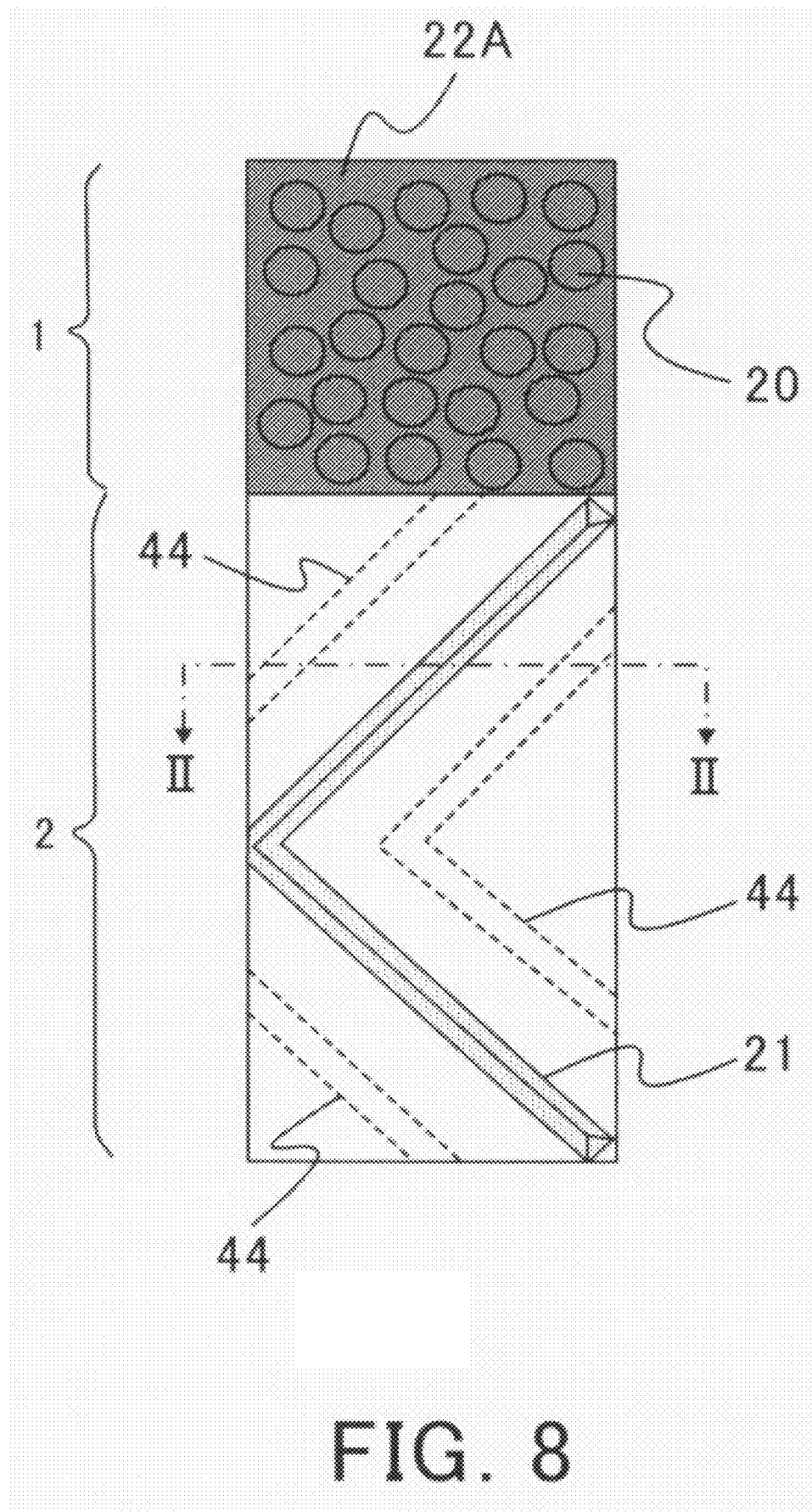
FIG. 8 is a plan view of the LCD device according to the third embodiment of the present invention.
Figure 9:
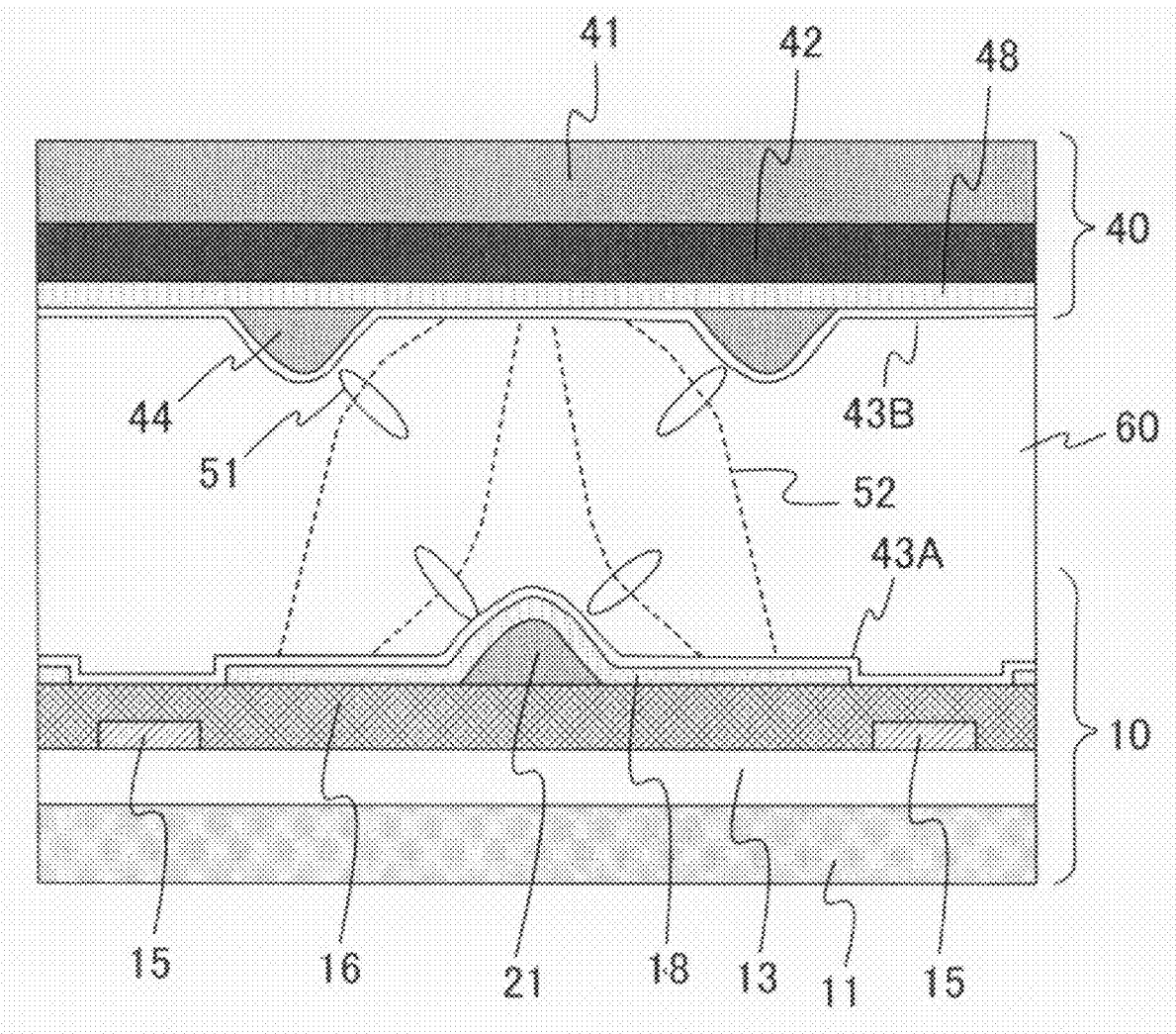
FIG. 9 is a cross-sectional view taken along the line II-II of FIG. 8, and is a view for illustrating an operation of the LCD device according to the third embodiment of the present invention.

In the third embodiment of the present invention, the protrusion 21 is formed in a rib-like shape as shown in FIG. 8. In addition, as shown in FIG. 9, protrusions 44 are also provided to a CF substrate. Hence, using protrusions respectively on both substrates, which are a TFT substrate 10 and a CF substrate 40, LC molecules are made to be aligned in different directions. Incidentally, in the present embodiment, since the protrusion 21 is placed on the transmissive electrode 18, how the electric flux lines curve is different from that in the first and second embodiments. Thereby, how the LC molecules 51 incline is also different, while the multi-domain alignment method is essentially the same as those of the first and second embodiments. Furthermore, the protrusion 21 and the uneven layer 20 of the present embodiment can be formed in the same way as that of the first embodiment of the present invention. Incidentally, dashed lines indicated by reference numerals 44 designate positions where the protrusions 44 are disposed. Here, the protrusions 44 are provided to the CF substrate facing the TFT substrate 10.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A liquid crystal display device comprising:
a first substrate;
a second substrate facing the first substrate; and
a liquid crystal layer interposed between the first substrate and the second substrate,
wherein a reflective region and a transmissive region are provided to a pixel, the pixel having a pixel electrode consisting of a reflective electrode of the reflective region and a transmissive electrode of the transmissive region, which are provided on the first substrate, the reflective electrode being formed on an uneven layer made of an organic film and the transmissive region including a protrusion formed of the same organic film material as the uneven layer to cause alignment of liquid crystal molecules in the liquid crystal layer to be spatially divided into multiple domains; wherein thickness of the liquid crystal layer in the reflective region and thickness thereof in the transmissive region are different from each other,
wherein the uneven layer of the reflective region is also used as a liquid-crystal layer-thickness adjusting layer to cause the thickness of the liquid crystal layer in the reflective region and the thickness thereof in the transmissive region to be different from each other.

2. The liquid crystal display device according to claim 1, wherein the liquid crystal layer is formed of liquid crystals with negative dielectric anisotropy.

3. The liquid crystal display device according to claim 1, wherein the protrusion is disposed under the transmissive electrode.

4. The liquid crystal display device according to claim 1, wherein the protrusion is disposed on the transmissive electrode.

5. The liquid crystal display device according to claim 1, wherein height of the uneven layer and height of the protrusion are different from each other.

6. The liquid crystal display device according to claim 1, wherein height of the uneven layer is higher than that of the protrusion.

7. The liquid crystal display device according to claim 1, wherein the thickness of the liquid crystal layer of the reflective region is about half the thickness of the transmissive region.

8. The liquid crystal display device according to claim 1, wherein the protrusion has one shape of a hemisphere and a square pyramid.

9. The liquid crystal display device according to claim 1, wherein the organic film material is formed of a photosensitive organic film.

10. The liquid crystal display device according to claim 1, wherein the transmissive electrode has a shape in which symmetric shapes are connected to each other.

11. A method of manufacturing the liquid crystal display device as claimed according to claim 1, the method comprising:
- forming the transmissive electrode made of a transmission conductive film on the first substrate;
- forming a photosensitive organic film on the first substrate;
- developing the photosensitive organic film after exposing by using a photomask, thereby concurrently forming an uneven layer and a protrusion formed of the photosensitive organic film respectively in an area of the reflective region and in an area of the transmissive region on the substrate; and
- forming a reflective electrode made of a metallic film on the uneven layer.

12. The method of manufacturing the liquid crystal display device according to claim 11, wherein the uneven layer and the protrusion are formed to have heights different from each other by exposing the uneven layer and the protrusion to different accumulated amounts of light, respectively.

13. The method of manufacturing the liquid crystal display device according to claim 11, wherein a part of the photomask includes a semitransparent film.

14. The method of manufacturing the liquid crystal display device according to claim 11, wherein light transmittance of a part of the semitransparent film of the photomask, which corresponds to the uneven layer are different from light transmittance of another part thereof, which corresponds to the protrusion.

15. The method of manufacturing the liquid crystal display device according to claim 11, wherein a part of the photomask includes a mask pattern having pattern width less than a limit of resolution for exposure.

16. The method of manufacturing the liquid crystal display device according to claim 11, wherein, while the metallic film is formed on the uneven layer, a metallic film of the same material as that of the metallic film on the uneven layer is concurrently formed on the protrusion.

17. A method of manufacturing the liquid crystal display device as claimed according to claim 1, the method comprising:
- forming a photosensitive organic film on the first substrate;
- developing the photosensitive organic film after exposing by using a photomask, thereby concurrently forming an uneven layer and a protrusion formed of the photosensitive organic film respectively in an area of the reflective region and in an area of the transmissive region on the first substrate;
- forming a transmissive electrode made of a transmission conductive film on the transmissive region; and
- forming a reflective electrode made of a metallic film on the uneven layer.

18. The method of manufacturing the liquid crystal display device according to claim 17, wherein the uneven layer and the protrusion are respectively formed to have heights different from each other by exposing the uneven layer and the protrusion respectively with estimated amounts of light exposure which are different from each other.

19. The method of manufacturing the liquid crystal display device according to claim 17, wherein a part of the photomask includes a semitransparent film.

20. The method of manufacturing the liquid crystal display device according to claim 17, wherein light transmittance of a part of the semitransparent film of the photomask, which corresponds to the uneven layer, and light transmittance of another part thereof, which corresponds to the protrusion, are different from each other.

21. The method of manufacturing the liquid crystal display device according to claim 17, wherein a part of the photomask includes a mask pattern having pattern width less than a limit of resolution for exposure.

* * * * *